United States Patent [19]

Gebhardt et al.

[11] 4,026,393
[45] May 31, 1977

[54] BRAKE DISC FOR DISC BRAKES ON RAIL VEHICLES

[75] Inventors: Hans Gebhardt; Franz Prahl, both of Munich; Corneliu Mircea Popescu, Lohhof; Mathias Schörwerth, Munich, all of Germany

[73] Assignee: Knorr-Bremse GmbH, Munich, Germany

[22] Filed: Mar. 10, 1976

[21] Appl. No.: 665,396

[30] Foreign Application Priority Data
Mar. 12, 1975  Germany ........................ 2510640

[52] U.S. Cl. ..................... 188/218 XL; 188/218 A
[51] Int. Cl.² ......................................... F16D 65/12
[58] Field of Search ........ 188/58, 73.5, 1 B, 218 A, 188/218 XL, 264 G; 192/70.17, 70.18, 107 R

[56] References Cited

UNITED STATES PATENTS

| | | | |
|---|---|---|---|
| 1,967,322 | 7/1934 | Pearmain | 192/70.17 |
| 2,105,188 | 1/1938 | Guy | 192/70.17 |
| 3,344,893 | 10/1967 | Pelikan | 188/58 |
| 3,650,361 | 3/1972 | Fossum | 188/1 B |

FOREIGN PATENTS OR APPLICATIONS

| | | | |
|---|---|---|---|
| 1,151,276 | 7/1963 | Germany | 188/218 XL |
| 72,026 | 4/1970 | Germany | 188/218 XL |
| 656,769 | 10/1963 | Italy | 188/218 XL |
| 35,734 | 10/1952 | Poland | 188/218 XL |
| 1,105,370 | 3/1968 | United Kingdom | 188/218 XL |

*Primary Examiner*—Trygve Blix
*Assistant Examiner*—Edward R. Kazenske
*Attorney, Agent, or Firm*—Edmund M. Jaskiewicz

[57] ABSTRACT

A brake disc for disc brakes on rail vehicles comprises an intermediate member connected to the inner peripheral surface of an annular element. The intermediate member is spaced radially from a hub and there are a pair of radially opposed annular grooves in the hub and intermediate member with blocks of resilient material in the opposed grooves. The blocks are pre-stressed and completely occupy the widths of the grooves. Heat inhibiting material is provided for inhibiting heat flow from the annular braking element to the resilient blocks.

4 Claims, 3 Drawing Figures

BRAKE DISC FOR DISC BRAKES ON RAIL VEHICLES

The present invention relates to a brake disc for disc brakes on rail vehicles, more particularly, to the connection between the annular braking element and the hub of such a brake disc.

Railway and other vehicles equipped with disc brakes are generally provided with a brake disc which is mounted either on the vehicle wheel or on an axle by means of a supporting member which may be in the form of a hub. The brake disc is so positioned that brake shoes can be pressed from both sides onto the lateral surfaces of the disc. The outer diameter of the support member is smaller than the inner diameter of the annular braking disc and both elements are interconnected by resilient members positioned between them in opposed annular recesses or grooves. These resilient elements are pre-stressed and are spaced uniformly about the periphery of these grooves.

In general, such brake discs have resilient clamping or securing elements between the hub or carrier member and the annular braking disc. Such clamping elements may comprise radially extending clamping sleeves disposed in opposing bores in the hub and annular member or various forms of positively engaging dovetail shaped connections. The purpose of all such resilient connecting structures is to absorb or at least minimize stresses or tensions which might be exerted as a result of thermal expansion of the annular braking disc when subjected to the braking operation. Such stressed or tensions may be transmitted to the hub or carrier member and if there were not a separation or resilient connection between the hub and braking disc this heating of the annular braking disc would result in cracks or even rupture of the annular braking disc.

Such resilient connections are also subjected to additional stressing arising from acceleration forces produced by horizontal and vertical impacts on the large mass of the annular braking disc. These stresses may also cause destruction of the brake disc by shearing of the clamping sleeves in combination with deformation of the bores receiving the clamping sleeves in combination with deformation of the bores receiving the clamping sleeves. The grooves or recesses for receiving other forms of positive resilient connections may also be subjected to deformation. All these stresses which generally result from rail joints, switch points and intersections do not decrease with increasing train speeds. Since increased train operating speeds are constantly sought after, it becomes extremely desirable to propose satisfactory connections between the carrier member and annular braking member of a brake disc.

Another form of connecting structure for brake discs as described above comprises a resilient element which is positively and firmly seated in the carrier member and whose ends diverge to the braking member and are positioned in a pre-stressed condition in recesses formed in the annular member collar. The shape of the connecting element is relatively complicated and requires numerous and precise machining operations. Since the recess in which the shaped resilient member is seated is open on both sides it is necessary to provide lateral retaining cover plates to absorb axially directed acceleration forces. These cover plates must be precisely manufactured and acurately mounted in order to prevent unbalance in the brake disc.

It is also known to mount the wheel tires of railway vehicle wheels by resilient connecting means with the wheel rims. Such connecting means have comprised pieces of rubber which are forced into recesses formed between the wheel flange and the outer periphery of the wheel rim. Such vehicle wheels are smoother riding and produce less impact and noise. However, this arrangement is disadvantageous in view of the high temperature which act upon the rubber elements and which are transmitted from the tires to the slabs pressed directly against them. As a result, there is a rapid aging and deterioration of the rubber materials.

It is therefore the principal object of the present invention to provide a novel and improved resilient mounting between the annular braking member and hub of a brake disc for disc brakes particularly adapted for rail vehicles.

It is another object of the present invention to provide such a resilient connecting means which readily absorbs shocks and impacts to which the brake disc may be subjected and thereby absorb any thermal stresses which may occur.

It is a further object of the present invention to provide such a resilient connecting member which is unaffected by high temperatures generated in the annular braking member during braking operations.

It is an additional object of the present invention to provide such a resilient connection which is simple in structure, effective in operation and requires a minimum of relatively simple manufacturing operations.

According to one aspect of the present invention such a brake disc may comprise an annular braking member spaced radially outwardly from a hub and an intermediate member is connected to the inner peripheral surface of the annular element. There is a pair of radially opposed annular grooves in the hub and intermediate member and a plurality of blocks of resilient material are in such grooves and uniformly distributed about the periphery thereof. The blocks are prestressed and fully occupy the grooves in their axail directions. Means are also provided for inhibiting heat flow from the annular braking element to the resilient blocks.

As a modification, in place of the intermediate ring the radially opposed annular grooves are formed in the hub and annular braking member with the resilient blocks being disposed in said grooves and there is a covering layer of heat inhibiting material in the groove of the annular braking member.

Other objects and advantages of the present invention will be apparent from the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
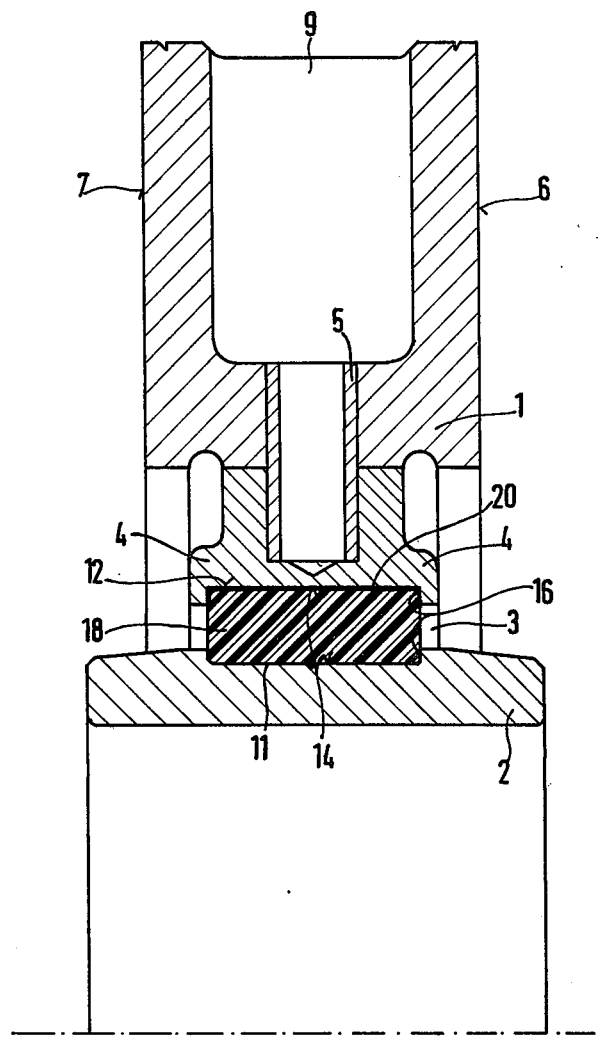
FIG. 1 is an axial sectional view of a half of a brake disc according to the present invention.
Figure 2:
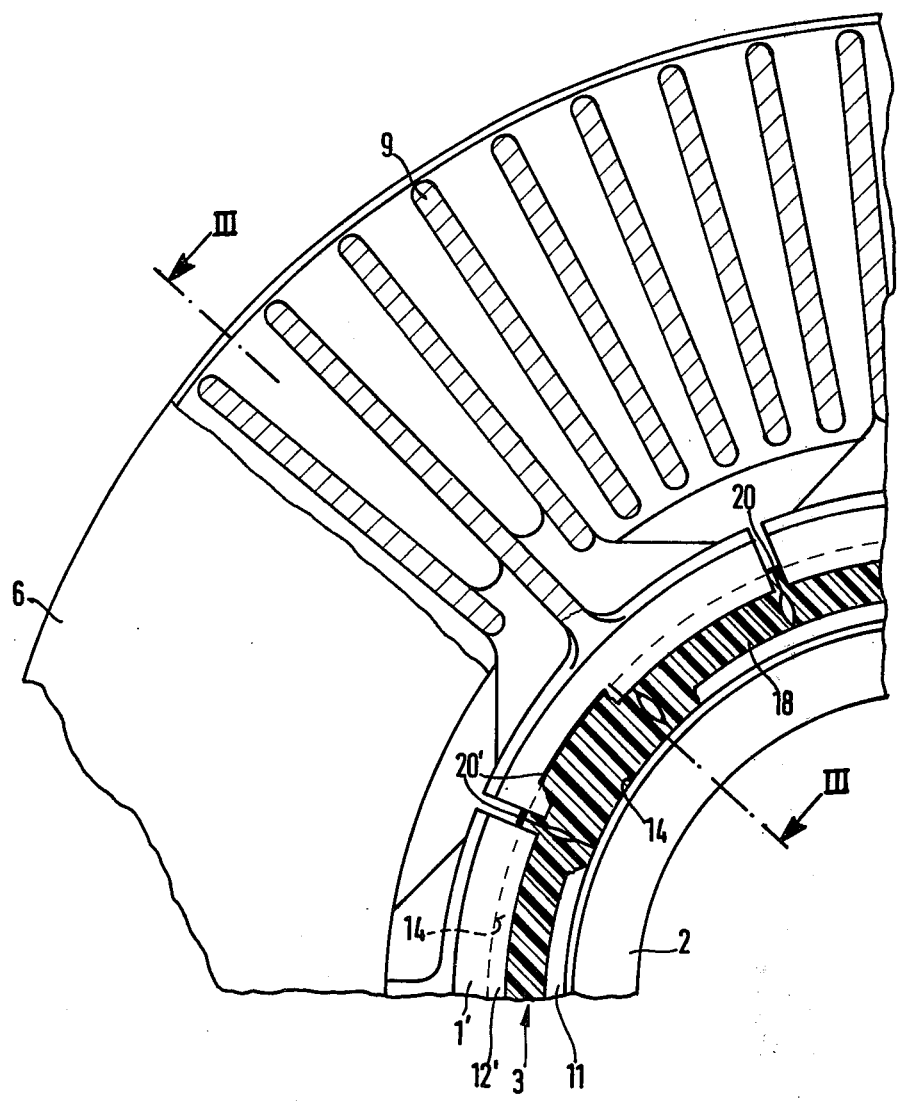
FIG. 2 is a side elevational view with portions thereof cut away of a brake disc incorporating a modification of the present invention; and, FIG. 3 is a sectional view taken along the line III—III of FIG. 2.

In the brake disc illustrated in FIG. 1, an annular braking element 1 is mounted co-axially upon a hub or carrier member 2. The inner peripheral surface of the annular braking member 1 is radially spaced with respect to the outer periphery of the hub 2 so as to define an annular space 3 therebetween. An intermediate ring 4 is positioned within the space 3 such that the outer periphery of the ring 4 is mounted to the inner periphery of the annular element 1. The connection between the ring 4 and braking element 1 can be as known in the art and may comprise a plurality of clamping sleeves 5 inserted into common radially opposed bores formed in the ring 4 and braking element 1.

The braking element 1 has laterally opposed friction surfaces 6 and 7 and ventilation ribs 9 therebetween to define a plurality of radially extending passages for cooling purposes. In the inner peripheral surface of the intermediate ring 4 and in the outer peripheral surface of the hub 2 there are formed radially opposed annular grooves 11 and 12 which are in mirror image relationship with respect to each other and which have a rectangular cross-section. The rectangular cross-section results in parallel base faces 14 in the axial direction and perpendicular thereto lateral or end surfaces 16.

A plurality of blocks 18 of resilient material such as natural or synthetic rubber or plastics are seated in the annular grooves 11 and 12. The blocks 18 are pre-stressed in a radial direction and are inserted into the space 3 by a special apparatus or tool known in the art to establish a resilient secure connection between the hub 2 and the annular member 1. Not only is this connection secure but it is resilient so as to dampen impacts and shocks which may be transmitted between the annular member 1 and the hub 2.

The intermediate ring 4 is of metal and may be made of a single integral unit or may be formed from a plurality of arcuate segments.

When the blocks 18 are unstressed its opposed parallel surfaces which are subjected to radial forces define plane surfaces which are parallel to each other and the entire surface of each block 18 may be metallized.

In order to protect effectively the resilient blocks 18 from excessive heating because of the high temperatures generated in the annular braking member, a covering layer 20 of a heat damping or inhibiting material such as asbestos, glass fibers or carbon fibers is positioned in the annular groove 12 of the intermediate ring. As a result, the full effects of heat generated in the braking element 1 and conducted to the intermediate ring 4 will be prevented from acting upon the resilient blocks 18.

Figure 3:
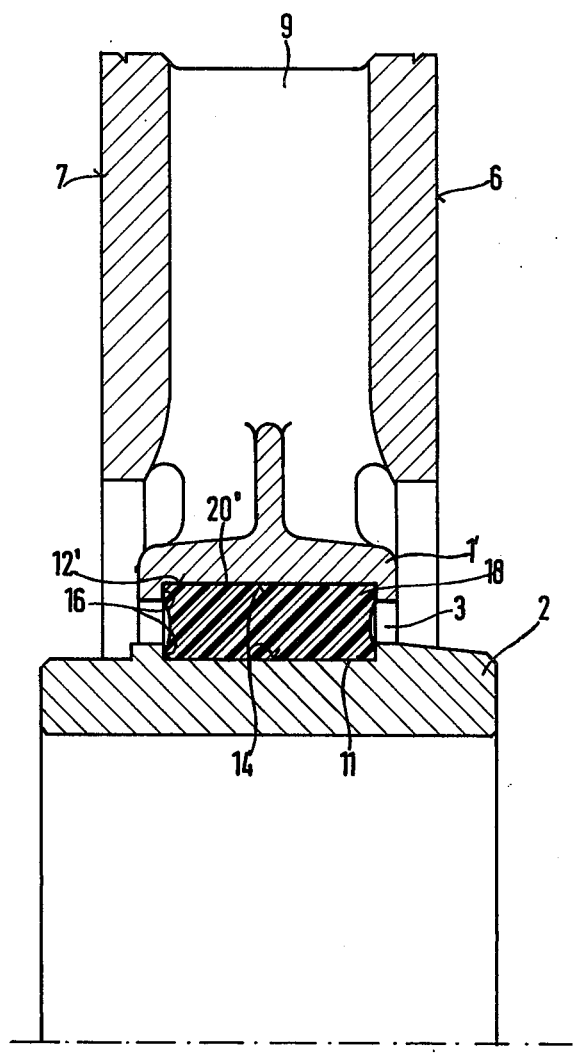

In FIG. 3 there is shown a modification of the present invention wherein radially opposed annular grooves 11' and 12' are formed in the outer peripheral surface of the hub 2' and in the inner peripheral surface of the annular braking element 1'. Thus, the braking element 1' is spaced radially from the hub 2' and this space is filled by the resilient blocks 18' in the manner as described above. The blocks 18 as in the previous embodiment completely fill the axial width of the grooves.

In the annular groove 12' there is a covering layer 20' of heat damping or inhibiting material. The covering layer 20' has a high degree of inner and outer structural strength so that the layer 20' is able in every manner to resist high radially directed compression forces transmitted to the layer from the blocks 18'. As a result, the covering layer 20' will not be deformed so as to bulge outwardly nor will the layer be displaced or shifted from its originally installed position.

In both embodiments of the present invention the resilient blocks 18 effectively absorb shocks and impacts transmitted to the unsprung components of the brake disc and as a result prevent high impact accelerations from being directed toward the clamping sleeves 5.

According to the present invention the intermediate ring 4 can also be constructed from a heat damping or inhibiting material so as to shield the blocks 18 against undesirable thermal influences.

The present invention has thus disclosed a simple and effective structure for preventing high temperatures generated in brake discs from having deteriorating effects on the resilient connections between the hub and braking element of a brake disc. It is to be noted that the high temperatures encountered in the brake discs occur not only as a result of braking operations but also from the climate and environmental conditions in which the brake discs are used. Also, certain operations of rail vehicles require frequent and repeated braking operations which would also contribute to the high temperatures encountered in the brake discs. The present invention effectively copes for all modes of operation of the rail vehicles wherein continuously high temperatures are to be expected.

It will be understood that this invention is susceptible to modification in order to adapt it to different usages and conditions, and accordingly, it is desired to comprehend such modifications within this invention as may fall within the scope of appended claims.

What is claimed is:

1. A brake disc for disc brakes on rail vehicles comprising a hub, an annular braking element having an inner peripheral surface spaced radially from said hub, an intermediate member connected to the inner peripheral surface of said annular element, there being a pair of radially opposed annular grooves in said hub and intermediate member, a plurality of blocks of resilient material in said opposed grooves and uniformly distributed about the periphery thereof to interconnect resiliently said hub and intermediate member, said blocks being pre-stressed and fully occupying said grooves in their axial directions, and a layer of heat-inhibiting material in the annular groove of said intermediate member to inhibit heat flow from said annular element to said resilient blocks.

2. A brake disc as claimed in claim 1 wherein each of said annular grooves has a rectangular cross section.

3. A brake disc as claimed in claim 1 wherein the surfaces of said blocks subject to radial forces are planar when said blocks are unstressed.

4. A brake disc as claimed in claim 1 wherein each of said blocks have the shape of a rectangular parallel piped when unstressed.

* * * * *